United States Patent
White

(10) Patent No.: US 10,801,645 B2
(45) Date of Patent: Oct. 13, 2020

(54) DYNAMIC APPLICATION CABLE ASSEMBLY WITH ADJUSTABLE ARMOR CLAMP

(71) Applicant: NEXANS, Courbevoie (FR)

(72) Inventor: Robert White, Houston, TX (US)

(73) Assignee: NEXANS, Courbevoie (FR)

( * ) Notice: Subject to any disclaimer, the term of this patent is extended or adjusted under 35 U.S.C. 154(b) by 270 days.

(21) Appl. No.: 15/857,089

(22) Filed: Dec. 28, 2017

(65) Prior Publication Data

US 2019/0203855 A1  Jul. 4, 2019

(51) Int. Cl.
| *F16L 3/12* | (2006.01) |
| *E21B 19/02* | (2006.01) |
| *E21B 41/00* | (2006.01) |
| F16L 15/00 | (2006.01) |
| H02G 3/06 | (2006.01) |
| H01B 7/04 | (2006.01) |

(52) U.S. Cl.
CPC ............ *F16L 3/1222* (2013.01); *E21B 19/02* (2013.01); *E21B 41/00* (2013.01); *F16L 15/008* (2013.01); *H01B 7/046* (2013.01); *H02G 3/0666* (2013.01)

(58) Field of Classification Search
CPC ..... F16L 3/1222; F16L 15/008; H02G 3/0666
USPC ........................................................ 248/56
See application file for complete search history.

(56) References Cited

U.S. PATENT DOCUMENTS

| 2,564,302 | A | * | 8/1951 | Fraser | H02G 3/0666 |
| | | | | | 174/653 |
| 4,549,038 | A | * | 10/1985 | Masheris | H02G 3/065 |
| | | | | | 174/653 |
| 4,608,454 | A | * | 8/1986 | Lackinger | H02G 3/0683 |
| | | | | | 174/651 |
| 4,807,911 | A | * | 2/1989 | Short | F16L 37/0925 |
| | | | | | 285/323 |
| 4,927,386 | A | * | 5/1990 | Neuroth | E21B 17/028 |
| | | | | | 439/201 |
| 6,145,597 | A | * | 11/2000 | Kobylinski | E21B 17/003 |
| | | | | | 166/369 |
| 6,488,317 | B1 | * | 12/2002 | Daoud | F16L 5/06 |
| | | | | | 285/148.18 |
| 7,075,007 | B2 | * | 7/2006 | Auray | F16L 5/00 |
| | | | | | 174/656 |
| 7,455,541 | B2 | * | 11/2008 | Jackson | H01R 13/5205 |
| | | | | | 439/274 |
| 8,616,588 | B2 | * | 12/2013 | Weinhold | F16L 3/1222 |
| | | | | | 285/365 |
| 9,371,948 | B2 | * | 6/2016 | Coyle, Jr. | F16L 19/12 |
| 9,564,695 | B2 | * | 2/2017 | Hammons | H01R 9/0524 |

(Continued)

FOREIGN PATENT DOCUMENTS

| CA | 2 464 045 | 8/1995 |
| GB | 251960 | 9/1926 |

OTHER PUBLICATIONS

European Search Report dated May 22, 2019.

*Primary Examiner* — Monica E Millner

(74) *Attorney, Agent, or Firm* — Sofer & Haroun, LLP

(57) ABSTRACT

A flange assembly for supporting a cable has a flange body and an armor retainer. The flange body and the armor retainer are configured to support a cable by compressing an armor layer of the cable against the armor retainer. The armor retainer and the flange body are separate pieces, that are removably attachable to one another.

2 Claims, 11 Drawing Sheets

(56) References Cited

U.S. PATENT DOCUMENTS

| | | | |
|---|---|---|---|
| 2003/0155147 A1* | 8/2003 | Robinson | H02G 3/083 174/652 |
| 2009/0151934 A1* | 6/2009 | Heidecke | E21B 19/165 166/250.01 |
| 2014/0076583 A1* | 3/2014 | Robichaux | E21B 33/14 166/382 |
| 2015/0318086 A1 | 11/2015 | Little et al. | |
| 2017/0338641 A1 | 11/2017 | Komori et al. | |

* cited by examiner

Power Loop

DYNAMIC APPLICATION CABLE ASSEMBLY WITH ADJUSTABLE ARMOR CLAMP

FIELD OF THE INVENTION

The present invention relates to a cable assembly for drilling and mining type cables. More particularly, the present invention relates to a cable assembly, and method for retaining drilling and mining type cables.

DESCRIPTION OF RELATED ART

A dynamic application cable assembly, as differentiated from a static application cable, is one which may be subjected to one or more cyclical or continual forces such as bending, twisting, tension, compression, thermal loading, external pressure, and the like.

Examples of such dynamic cable assemblies include top drive service loop cable assemblies for drilling rigs, bridle cable assemblies used on offshore tender vessels, and shuttle car cable assemblies used in mining operations. These large dynamic application cables typically include a combination of electrical wires, hydraulic lines and fiber optic cables. For protection, the cables are fitted into a large diameter rubber hose which is often reinforced with steel wires or synthetic fibers. Within this hose there is typically a potting material to support the cable components against the inside diameter of the hose as shown for example in the prior art FIGS. 1 and 2.

However, cables manufactured according to such designs are very heavy and relatively inflexible. In addition, they typically have a large outer diameter which often limits the effective bending radius of the assembly. While the prior art designs are workable, they are not ideal for the dynamic applications in which they are used. These cable assemblies are repeatedly subjected to moving forces, particularly bending and flexing, in which the size, weight, and relative stiffness of the assembly often limits its effective run life. Since the cable assembly is a vital link in the operation of the equipment to which it is connected, the cost of reduced run life of the assembly may be measured in the cost of down-time in the associated equipment. Especially in drilling and mining operations this translates into lost production, and typically hundreds of thousands of dollars per day in lost revenues.

Additionally, these designs are generally not field-repairable and in most cases the cable assembly must be replaced when it is damaged. This has the potential impact of extending the down-time of the operation even further.

The need exists for a lighter, smaller, and more flexible cable assembly which may be temporarily repaired in the field. Not only will such a design improve the assembly's run life, but it will also meet the ever-harsher environments and dynamic applications in which such an assembly is applied.

OBJECTS AND SUMMARY

The present arrangement overcomes the drawbacks associated with the prior art and provides a dynamic application cable assembly, including a cable and connection arrangement that incorporates several improved design features that collectively work to support not only the weight of the cable but also the dynamic loads experienced by the cable assembly without the need for the potted hose design from the prior art. Additionally, since the present arrangement does not include the potted hose design, it lends itself to temporary repairs in the field.

Such a cable assembly, in accordance with one embodiment, among other features, has a thick inner cable jacket with reinforced aramid fibers designed to carry the load of the assembly. For example, the jacket thickness for drilling cables is equal to or greater than twice the thickness specified for such cables according to IEEE 1580, Recommended Practice for Marine Cable for Use on Shipboard and Fixed or Floating Facilities (incorporated herein by reference). The arrangement further includes a high-strength, high-dielectric resin chemically bonded to the inner jacket of the cable as well as to the assembly support flange. An overall metallic armor provides both additional cable support and electrical grounding. A braid shielding for power cables provides a unique grounding arrangement within the flange body itself.

To this end, the present arrangement includes a cable and flange assembly having at least one cable and at least one flange. The cable has an armor, a jacket and at least one conductor element therein. The flange includes a flange body, an armor retainer and a grommet holder. The armor of the cable is configured to be secured to the flange via the armor retainer.

In one embodiment, the flange assembly is adapted to employ a separate armor retainer. The armor retainer is then inserted into, or threaded on for larger sizes, to the flange body. Different armor retainers and their pressure surfaces can be sized for different cables, thereby reducing the amount of flange body that must be sized for each new cable design. This would allow one size flange body to be used for cables with different inner jacket diameters, for example, ranging from 2"-4.5," using the same basic flange body structure.

BRIEF DESCRIPTION OF THE DRAWINGS

The present invention can be best understood through the following description and accompanying drawings, wherein.

DETAILED DESECRATION

Figure 1:
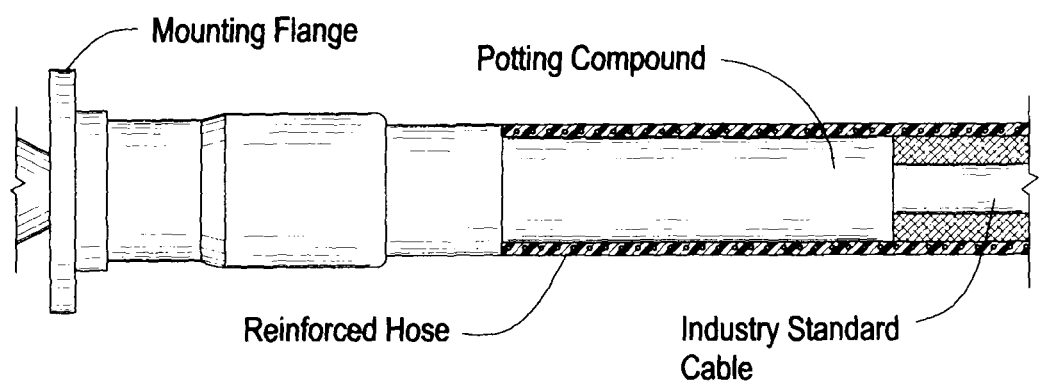
FIG. 1 is a prior art image of a dynamic application cables.
Figure 2:
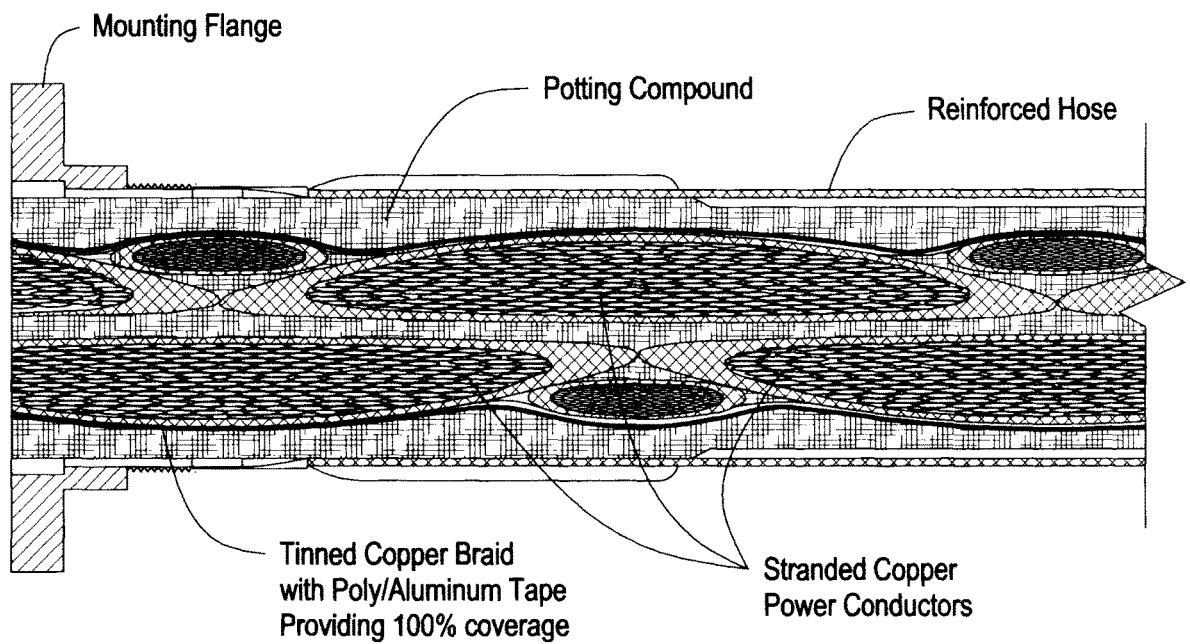
FIG. 2 shows a more detailed prior art arrangement for a dynamic application mining and drilling cable within a potted hose assembly.
Figure 3:
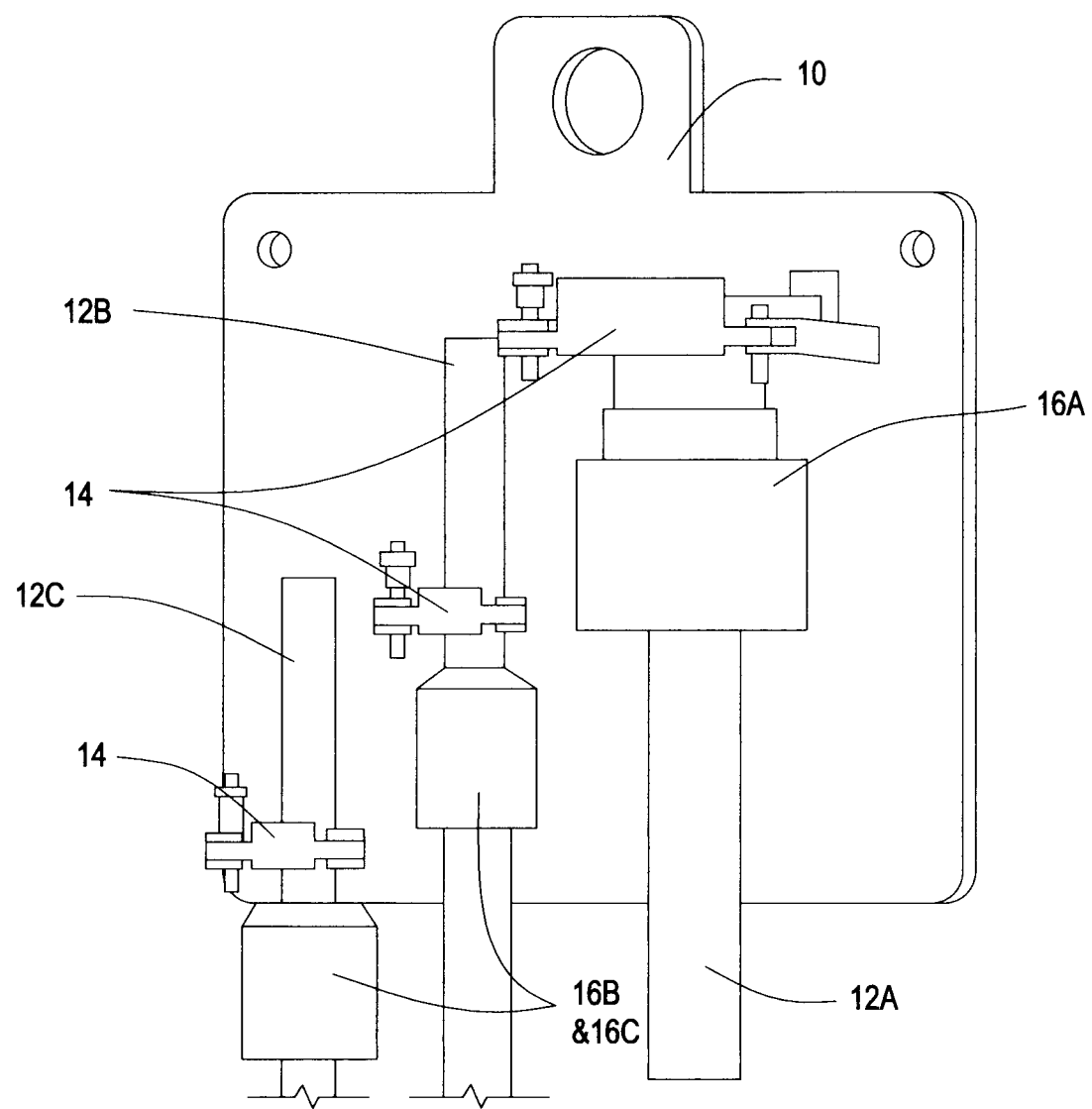
FIG. 3 shows a support arrangement, flange and cables in accordance with one embodiment.

In accordance with one embodiment of the present arrangement, FIG. 3 illustrates a series of cables 12, such as 12A-12C, each attached to a support arrangement 10. Support 10 is constructed with brackets 14 for connecting with one or more flanges 16 coupled to the end of cables 12.

For the purposes of illustration, FIG. 3, shows an arrangement where support 10 can be employed for a drilling rig application as explained in more detail below. Here each cable flange 16A-16C is respectively mounted to the end of a cable 12A-12C, with flanges 16A-16C being held to support 10 via a corresponding support bracket 14 which is preferably made of steel. Support 10 is in turn attached to the drilling rig structure, operating equipment or the like. A typical rig installation might include three separate cable assemblies which provide power via cable 12A, control via cable 12B, and instrumentation capabilities via cable 12C to a drilling rig top drive equipment 20 as shown in the exemplary FIG. 4.

One flanged end of each cable 12A-12C is mounted upon support arrangement 10 which is in turn attached to stationary rig derrick 22, and the other flanged end of cables 12A-12C is mounted upon support arrangement 10 which is in turn attached to the movable top drive equipment 20. The top drive equipment 100 (i.e. drill) moves up and down repetitively within derrick 22 during the drilling operation, thus articulating the affixed cable assemblies during the process.

Bracket 14 may be bolted to either the stationary derrick 22 or to the movable top drive equipment 20 of rig 22. Thus in the example shown in FIG. 4 cables 12A-12C connect drilling rig 22 to movable top drive equipment 20 via a "service loop" or cable assembly 11. Cable assembly 11 includes cables such as cables 12A-12C attached to derrick 22 as well as to top drive equipment 20, Cable assembly 11 as referred to throughout is simply the bundle of cables 12A-12C either bound together, loosely held in a sleeve or otherwise somewhat coupled to one another to avoid entanglement.

Figure 5A:
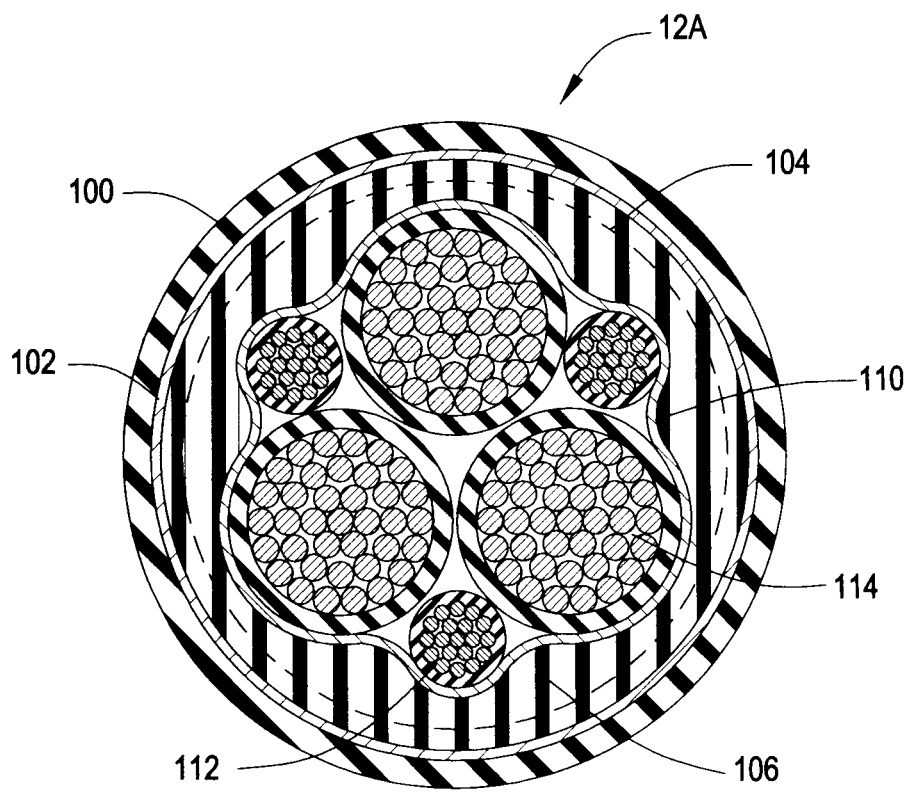
FIGS. 5A-5C illustrate cable construction cross-sections in accordance with one embodiment.
Figure 5B:
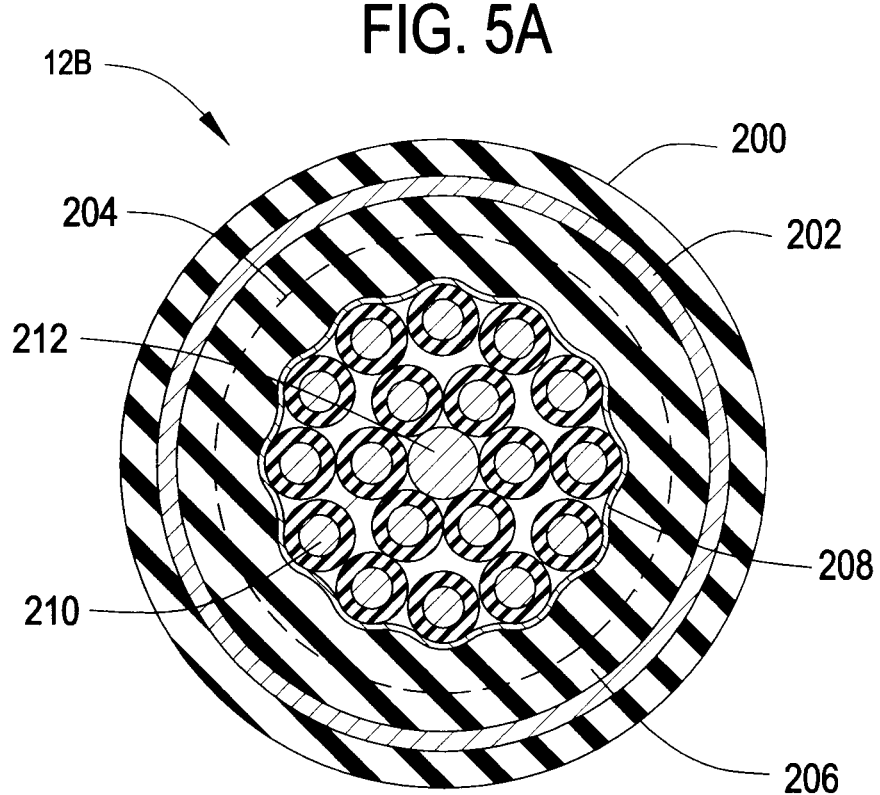
Figure 5C:
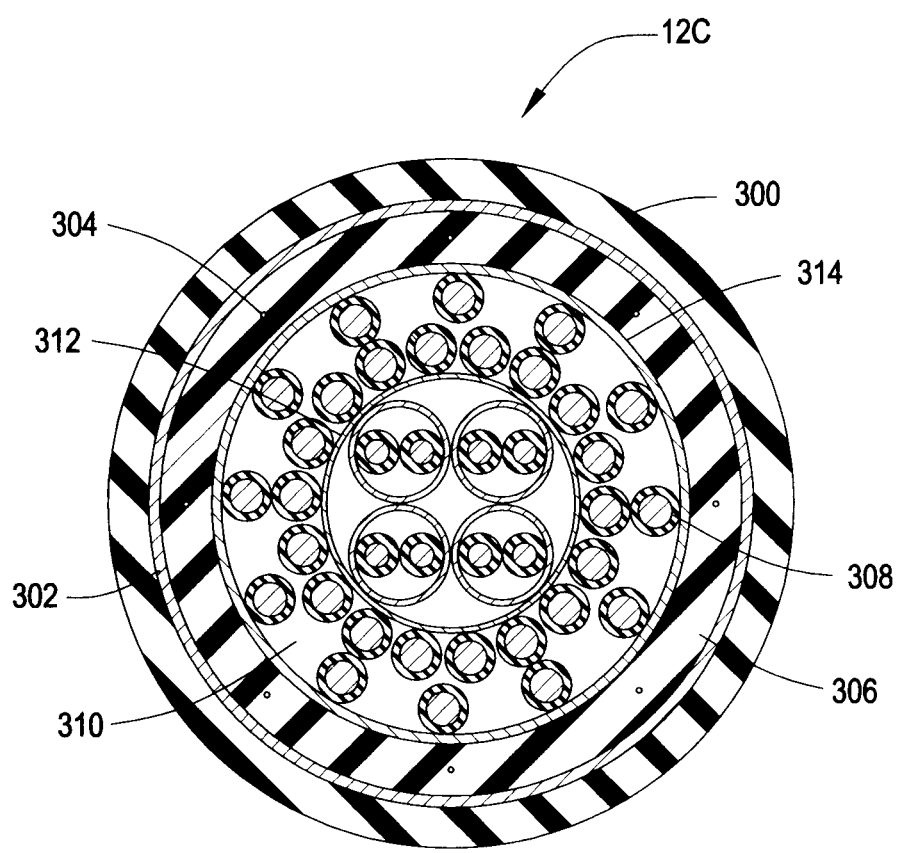

Turning to the structure of cables 12A-12C, as shown in FIGS. 5A-5C, the exemplary basic structure of power cable 12A includes an outer sheath 100, armoring 102, and a reinforcement layer 104 within jacket 106. Inside of jacket 106, power cable 12A has a shielding 110, encompassing the entirety of the conducting elements. For example, inside shielding 110, there are primary ground wires 112 and conductors 114 (777KCMIL 1/C—Kilo circular mils) forming the core of cable 12A.

As shown in FIG. 5B, the basic structure of control cable 12B, includes an outer sheath 200, armoring 202, and a reinforcement layer 204 within inner jacket 206. Inside of inner jacket 206, cable 12B has a core binder 208 having a group of insulated conductors 210 and a central filler 212.

As shown in FIG. 5C, the basic structure of auxiliary/instruments cable 12C, includes an outer sheath 300, armor 302, and a reinforcement layer 304 within inner jacket 306. Inside of inner jacket 306, cable 12C has a series of electrical conductors 308, filler 310 and a central set of twisted pair communication cables 312 all held within binder 314.

Figure 4:
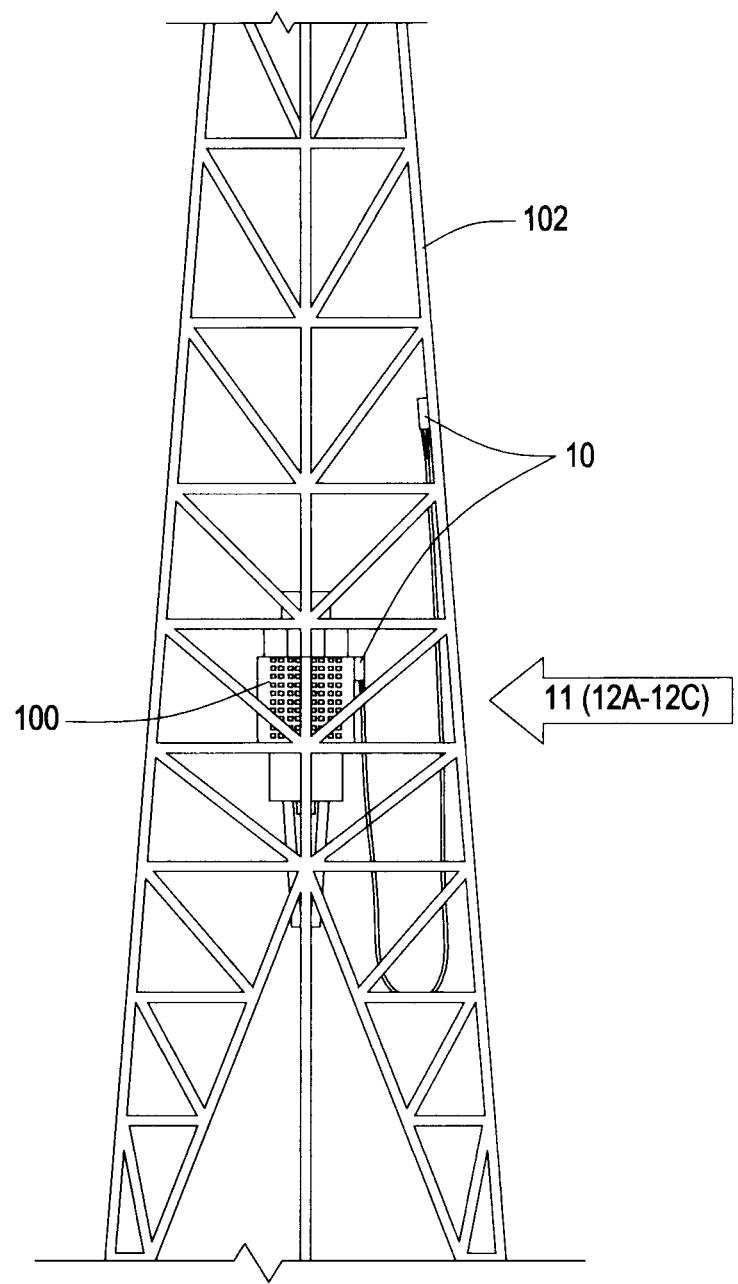
FIG. 4 shows a top drive and drilling rig using the support arrangement of FIG. 3 in accordance with one embodiment.

In accordance with one embodiment, the design of cables 12A-12C works together with the structure of flanges 16A-16C to create a durable cable which stands up to multiple flexations typically seen in dynamic applications such as on top drive service loops 11 (e.g. FIG. 4). The thickness of inner jackets 106, 206, 306 of each of cables 12A-12C is greater than or equal to the thickness specified for such cables according to standard IEEE 1580, and includes an aramid fiber reinforcement 104, 204, 304. According to this arrangement, when cables 12A-12C and their corresponding jackets 106, 206, 306 are properly secured to flanges 14 and brackets 16, this reinforcement along with the thick jackets 106, 206, 306 allows the entire weight of cables 12A-12C to be supported by jackets 106, 206, 306, with a generous safety factor.

The present arrangement also employs a different armor than the prior art which is usually made of bronze or tinned copper. In one arrangement armor 102, 202 and 302 is constructed from 316 type stainless steel (standard molybdenum-bearing grade, austenitic stainless steel). Stainless steel armor such as 102, 202 and 302 serve three purposes: First, it protects cables 12A-12C from external damage. Second, it is designed in such a way that it also independently supports the weight of cables 12A-12C, along with a generous safety factor, when properly secured. Third, it guards against Electromagnetic Interference (EMI) when primary shielding is not provided between adjacent cables, when properly grounded electrically.

Figure 6A:
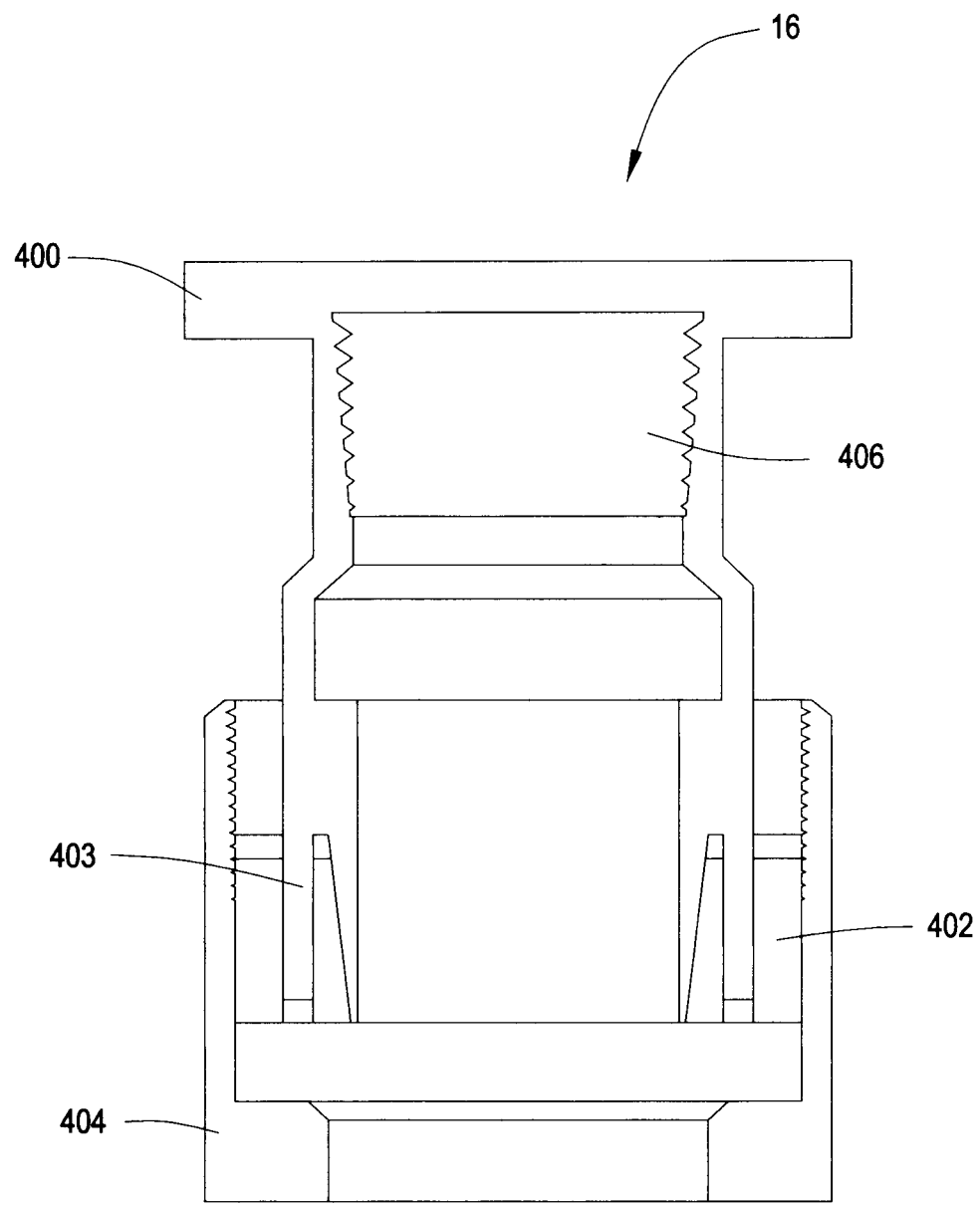
FIGS. 6A-6B illustrate flanges for the support arrangement of FIG. 3 in accordance with one embodiment.
Figure 6B:
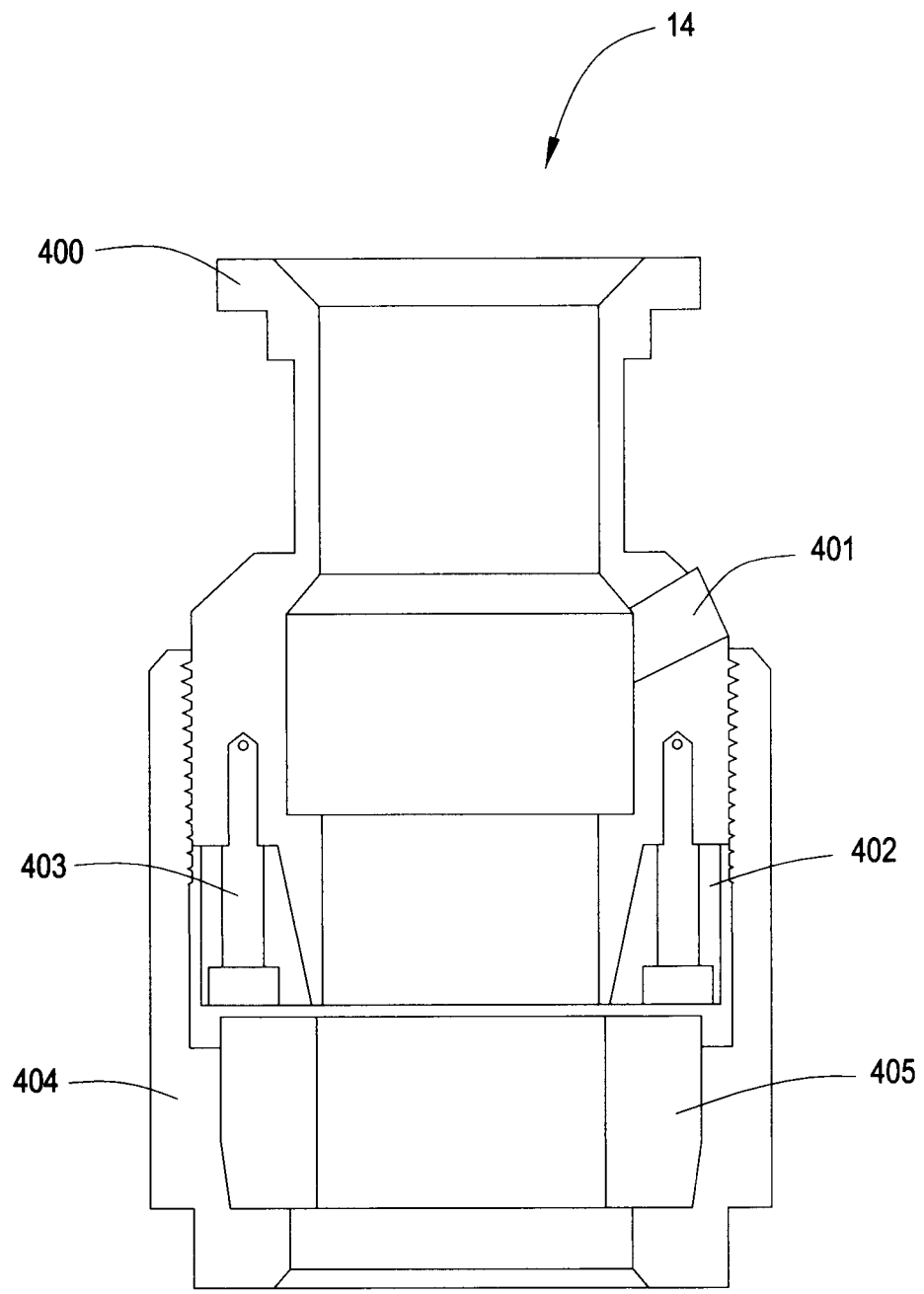

Turning now to the structure of flanges 16A-16C, each of which are configured to support a cable 12A-12C when being attached to bracket 14 of support 10 (see FIG. 3), FIGS. 6A and 6B show an exemplary flange 16 having a flange body 400, armor retainer 402, and grommet holder 404. Flange body 400, while varying in dimensions for different cables 12A-12C serves the basic function of enabling inner jackets 106, 206, 306 of cables 12A-12C to be supported by means of a polymer bonding agent added through fill port 401 (FIG. 6B), The polymer bonding agent is designed to bond chemically with cable jackets such as 106, 206, 306, Flange body 400 has a void which, when filled with the polymer bonding agent, geometrically prevents cable 12 from being pulled through flange body 400 since the cured polymer gets bonded to cable jackets such as 106, 206, 306.

Armor retainer 402 serves a dual purpose in each flange 16. First, armor retainer 402, works to secure stainless steel armors such as 102, 202, 302 so that the weight of cables 12A-12C may be supported entirely by the stainless steel armor. Second, armor retainer 402 acts as an electrical ground path between stainless steel armor 102, 202, 302 and flange 16.

Figure 7A:
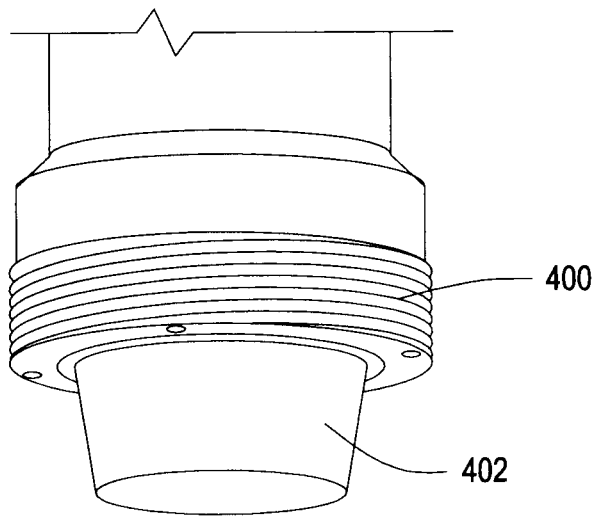
FIGS. 7A-7C illustrate flanges with separate armor retainers, in accordance with one embodiment.
Figure 7B:
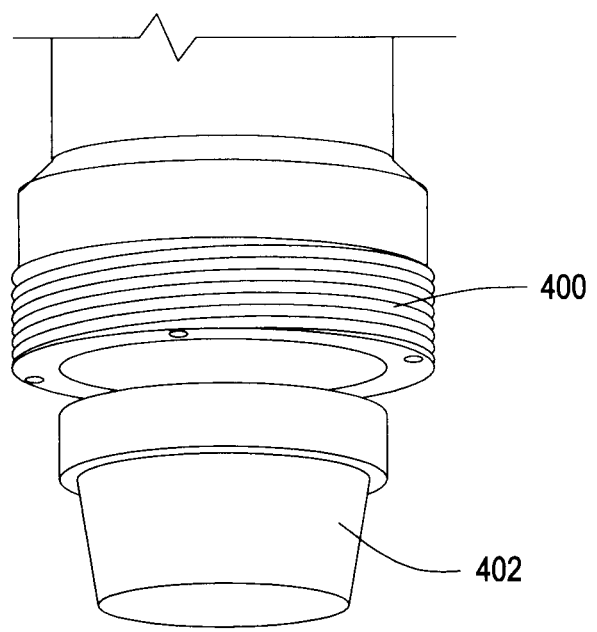
Figure 7C:
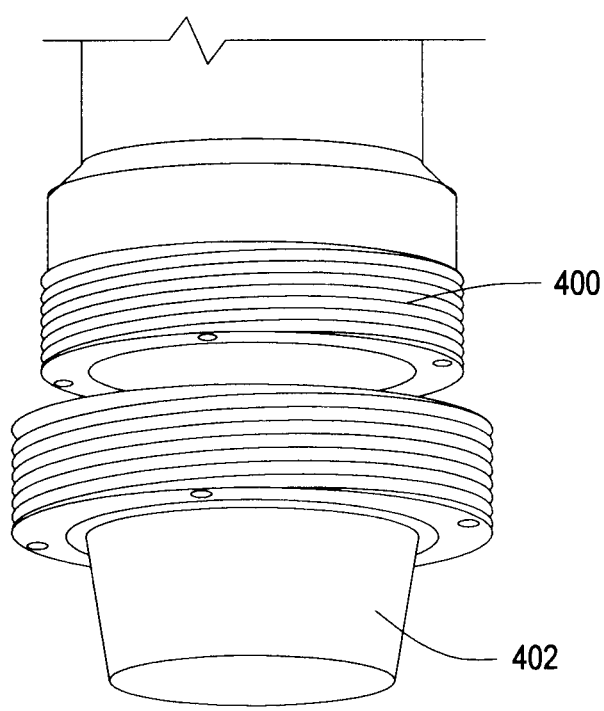

In one embodiment shown in FIGS. 7A-7C, armor retainer 402 and its associated pressure surface (surface that faces stainless steel armor 102, 202, 302) is configured as a separate structure releasably attached to flange body 400. Because armor retainer 402 retains armor 102, 202, 302 of the associated cable, its structure is dimensioned to correspond to the diameter of inner jackets 106, 206, 306 and the armor 102, 202, 302 that directly surrounds it. Every time a flange body 400 is to be arranged for a different sized cable, a different sized armor retainer 402 can be employed.

However, most of the parts of flange body 400 are structured to handle different sized cables and do not need to be changed. By making armor retainer 402 a separate component from flange body 400, one sized flange body 400 could accommodate several different sized cables simply by applying the correctly sized armor retainer 402 into flange body 400.

In one arrangement shown in FIGS. 7A and 7B (exploded view), armor retainer 402 is inserted or screwed into flange body 400. In this example, armor retainer 402 is designed to retain the armor 102, 202, 302 of a cable with an inner jacket 106, 206, 306 having a certain diameter, such as 4." In this arrangement armor retainer 402 is threaded on the outside and screwed into corresponding threads on the inside of flange body 400.

In another arrangement shown in FIG. 7C, armor retainer 402 is inserted or screwed onto flange body 400 (the same sized flange body 400 as shown in FIGS. 7A and 7B). In this example, armor retainer 402 is designed to retain the armor 102, 202, 302 of a cable with an inner jacket 106, 206, 306 having a certain diameter, such as 4.5". In this arrangement the larger armor retainer 402 is threaded on the inside and screwed onto corresponding threads on the outside of flange body 400.

It is understood that the feature of the armor retainer 402 being a separate component from flange body 400 is described above with the present flange body 400 for illustration purposes only. However, the feature of the armor retainer 402 being a separate component from a flange body may be equally employed in other flange body arrangements of similar design.

Returning to the assembly the components of flange body 400, grommet holder 404 of flange 16, when screwed on to flange body 400, compresses a rubber grommet 405 (FIG. 6B) which then creates a seal within the interior of flange body 400. This not only prevents the ingress of water into flange 16A-16C but also prevents the polymer bonding agent from escaping during the pouring and subsequent curing process. Additionally, grommet holder 404 compressed armor 102, 202, 302 against armor retainer 402.

In one arrangement, flange 16 for power cable 12A has one additional item, namely a shield terminator 406. Shield terminator 406 secures shielding 110 of power cable 12A, which is typically created from tinned copper braid, and allows for a second electrical path for EMI shielding.

Such flanges 16A-16C may be advantageously made from a variety of materials depending on the application. High strength steel is typically used for land based applications (ASTM (American Society, for Testing and Materials—incorporated herein by reference) standards such as—A675, GR 70, 4140 HT, etc.) and stainless steel is predominantly used for applications where corrosion resistance is required (AISI (American Iron and Steel Institute) standards such as 316, AISI 304, etc—incorporated herein by reference).

The present flanges 16A-16C, and associated connection points for cables 12A-12C differ considerably from the prior art configurations. However, flanges 16 are designed to attach to industry standard mounting brackets 10 and 14 without modifications to brackets 10 and 14.

For example, in the prior art design the flanges are hydraulically swaged or crimped onto a rubber hose, the construction of which may or may not incorporate some type of hose reinforcement. Sometimes threaded mating components are coupled to the connected flanges to enable attachment of the flange assembly to the support bracket. This prior art design is not well suited for resisting some of the dynamic forces to which the cable assembly is subjected, particularly some of the extreme transient loads which often accompany sudden starting and stopping of the associated equipment, such as the top drive on a drilling rig. Prior art designs have demonstrated a propensity to fail at the point of the hose-to-flange connection, where the hose tears away from the flange and irreparably damage the cable assembly.

In contrast to the prior art drawbacks, the present invention incorporates a flange 16 whose unique internal geometry provides a system of redundant reinforcements of the cable assembly to minimize the possibility of failure even during the most extreme dynamic force applications or transient conditions. For example, as mentioned before, one of the support mechanisms for cables 12A-12C of cable assembly 11 is stainless steel armors such as 102, 202, 302 in conjunction with flange armor retainer 402. This arrangement supports the entire weight of cables 12A-12C under dynamic loading conditions. In addition to that support mechanism is the polymer bonding agent used in conjunction with the central cavity of flange body 400.

Once the polymer cures and sets up within flange body 400 and also chemically bonds to the jackets such as 106, 206, 306 surrounding each of the individual conductors within cables 12A-12C, this additional support mechanism is capable of independently supporting all cables 12A-12C within the entire cable assembly 11 even if the stainless steel armor system were to fail.

Figure 8:
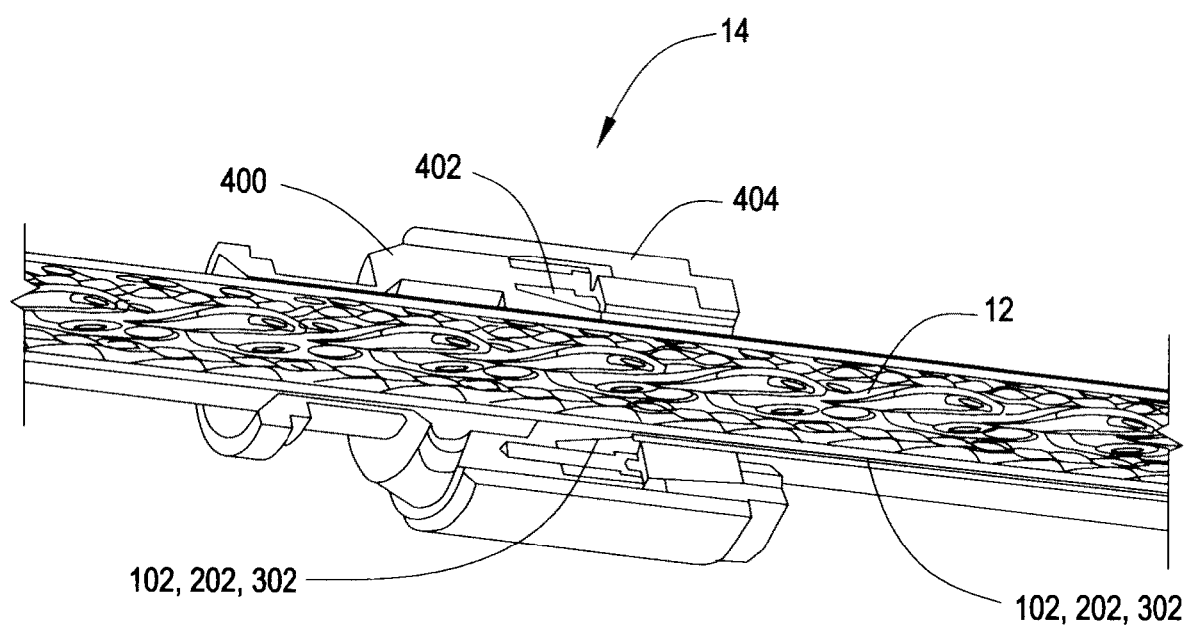
FIG. 8 illustrates a cable and flange in accordance with one embodiment.

The net result as shown in FIG. 8, combines an extremely rugged and durable cable construction in conjunction with a unique flange design. This arrangement eliminates the need to encase cable 12 within a rubber hose filled with a potting compound surrounding the cable, as required by prior art designs. As a result of this arrangement, the overall cable 12A-12C and related assembly 11 is lighter, smaller, and is capable of being bent into a tighter radius.

Some of the advantages associated with various embodiments of the present invention include the elimination of the protective hose. Since the protective hose and associated expansive potting material is eliminated, the effective outside diameter (OD) of the cable assembly 11 is decreased by as much as 35% as discussed in more detail below. This smaller cable OD enables the entire assembly 11 to be bent at a significantly smaller radius during dynamic operation than would a prior art potted-hose design. Since it is not uncommon for a cable assembly to be subjected to bends during operation which may exceed the allowable bend-radius ratings of the assembly, this smaller OD feature provides improved run life capability of the cable assembly 11.

By way of example, a typical power cable bundle in the prior art design might have an OD of 3 inches. When this bundle is placed within a 4-inch inside diameter (ID) protective hose, the effective outside diameter (OD) of the assembly would typically be around 4.75 inches, depending upon the thickness of the hose. All cable assemblies have a recommended minimum bending radius beyond which the assembly may experience premature failure. The recommended minimum bending radius for these types of cable assemblies is established by IEEE standards. In the case of drilling cable applications the recommended minimum bending radius is 8 times the outside diameter (OD) of the cable assembly. In this example the 4.75 inch assembly should not be bent to a radius any smaller than about 38 inches (4.75".times.8). On the contrary, the present arrangement even with its double-thick jackets 106, 206, 306 on cables 12A-12C and overall stainless steel armor 102, 202, 304, has an outside diameter (OD) for the entire assembly 11 of about 3.75 inches, implying that its minimum bending radius should be around 30 inches (3.75".times.8). This smaller cable assembly 11 outside diameter (OD) not only provides an increased margin of safety and increased run life in applications where the assemblies 11 may be over-bent, but it also enables drilling equipment operators to install these cable assemblies 11 over smaller radius cable sheaves, thus saving valuable rig space and weight.

As shown in FIG. 8, stainless steel armors such as 102, 202, 302 which surrounds cables 12A-12C in the present arrangement not only provides added mechanical protection for cable 12A-12C which is not embodied in the prior art design, but also provides additional EMI protection for assembly 11. Moreover, armor 102, 202, 302 is designed to be secured to flange 16 by means of armor retainer 402 described above so as to support the entire cable assembly 11. This provides the added advantage of securely grounding stainless steel armor 102, 202, 302 to the grounded flange 16, thus providing the EMI protection. Additionally, as noted above, should flange 16 be used with a cable of a smaller diameter, such as 4" instead of 4.75", an appropriate sized armor retainer 402 can be used.

Even with the extra thick inner jackets 106, 205 and 306 and stainless steel armor 102, 202, 302, cable assembly 11 of cables 12A-12C is as much as 30% lighter in weight than a comparable prior art design which has a cable inside a hose filled with potting compound. This weight reduction not only helps to increase cable run life but also contributes substantially to the ongoing goal of rig operators to reduce their overall rig weights and footprints, especially in offshore applications where weight and space reductions are becoming more and more essential to cost effective rig operation.

In the case of power cables 12A, the present arrangement further includes a shield terminator 406 within flange 16 to which the cable's inner braided shield 110 may be terminated and solidly grounded to flange body 400 within the sealed interior. This provides a primary means of EMI protection for cable 12A. Such braid wires in prior art constructions often have to be terminated to a ground point outside of the cable/hose assembly, leaving it exposed to possible mechanical damage or corrosion.

The design of flange 16 in conjunction with the design of cables 12A-12C incorporates a secure and reliable grommet sealing system 404 which serves to protect assembly 11 and the cables 12A-12C therein from water ingress. The arrangement is designed to maintain that seal even during the repetitive flexing operations to which cable assembly 11 is often subjected. In prior art designs it is possible for water to eventually find a path into the potted interior of the cable and hose assembly, especially if the bond of the potting to the ID of the rubber hose breaks loose over time and as a result of repeated flexing. This is an ongoing potential problem with these potted hose assemblies of the prior art since the hoses are produced on a mold, and as such a mold release agent coats the ID of the hose. This mold release agent can frequently interfere with the effective chemical bonding of the potting to the hose. Since water within a cable assembly leads to decreased run life, the present invention will help to increase the overall cable assembly reliability and its run life by more effectively sealing out that water.

The present arrangement also lends itself to temporary field repairs in the event that the cable assembly 11 may be damaged during the operation of the associated equipment. This is particularly important during drilling operations, for example, when a drill pipe or associated components may be accidentally knocked into cable assembly 11, thus damaging cables 12A-12C. With the prior art design, should this accidental force cause the hose to tear from its flange and the interior cable and potting to be damaged, there is no way to repair the assembly in the field. The entire cable assembly must be immediately replaced, causing expensive down time. The present arrangement provides an operator the potential to cut, splice and repair a damaged cable 12A-12C without replacing the entire assembly, since there is no hose or potting. In this way, operations may be maintained on a temporary basis until a scheduled equipment downtime enables cable assembly 11 to be replaced by a new one without loss of rig drilling time.

While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

What is claimed is:

1. A flange assembly for supporting a cable comprising:
   a flange body having connective elements on at least two connecting faces, including an inside face and an outside face; and
   at least a first and second armor retainers, said first armor retainer having a first diameter and a first corresponding connective element on a first connecting face, said second armor retainer having a second diameter, larger than said first diameter, said second armor retainer having a second corresponding connective element on a second connecting face;
   wherein said flange body and one of each of said first and second armor retainers are configured to support said cable by compressing an armor layer of said cable against one of said armor retainers,
   wherein said first and second armor retainers and said flange body are separate pieces, with either one of said first or second armor retainers are removably attachable to said flange body, such that said first armor retainer is connectable to said flange body by mating said connective element on said inside face with said first corresponding connective element on said first connecting face of said first armor retainer, and such that alternatively, said second armor retainer is connectable to said flange body by mating said connective element on said outside face with said second corresponding connective element on said second connecting face of said second armor retainer.

2. The flange assembly as claimed in claim 1, wherein said flange body, at connection elements of said flange body and said corresponding connection elements of said first and second armor retainers are threaded connection elements.

* * * * *